United States Patent [19]

McPherson et al.

[11] 3,774,155

[45] Nov. 20, 1973

[54] INTERPRETIVE DATA RECORDER WITH SORT CAPABILITY

[75] Inventors: Frank H. McPherson, Rosemont; Irvin S. Lownes, Jr., Norristown; Thomas L. Richardson, Horsham, all of Pa.

[73] Assignee: Decision Data Computer Corporation, Warminster, Pa.

[22] Filed: May 17, 1971

[21] Appl. No.: 144,075

Related U.S. Application Data

[63] Continuation-in-part of Ser. No. 81,250, Oct. 16, 1970, Pat. No. 3,706,074.

[52] U.S. Cl. .............. 340/172.5, 235/61.1

[51] Int. Cl. .............. B06F 7/10, G06f 7/06

[58] Field of Search .............. 340/172.5; 235/157, 235/61.1, 61.12 R, 61.1

[56] References Cited

UNITED STATES PATENTS

| | | | |
|---|---|---|---|
| 3,360,781 | 12/1967 | Boehnke | 340/172.5 |
| 3,343,142 | 9/1967 | Clark | 235/61.12 R |
| 3,124,674 | 3/1964 | Edwards et al. | 235/61.1 |
| 3,023,952 | 3/1962 | Thomas | 235/61.1 |
| 3,072,328 | 1/1963 | Bewley et al. | 235/61.1 |
| 3,358,270 | 12/1967 | Crew et al. | 340/172.5 |
| 3,544,967 | 12/1970 | Sallach | 340/172.5 |

OTHER PUBLICATIONS

Reference Manual–IBM 1401 Data Processing System, A 24–1403–5, April 1962.

*Primary Examiner*—Paul J. Henon
*Assistant Examiner*—Mark Edward Nusbaum
*Attorney*—Andrew R. Klein et al.

[57] ABSTRACT

An interpretive data recorder with sort capability which represents the first punch card machine capable of performing all of the required data preparation, auxiliary and peripheral input-output operations necessary for complete transaction and master file processing for conventional file updating and maintenance in data processing applications.

8 Claims, 14 Drawing Figures

INVENTORS
FRANK H. McPHERSON
IRVIN S. LOWNES Jr.
THOMAS L. RICHARDSON
BY Synnestvedt & Lechner
ATTORNEYS INVENTORS
FRANK H. McPHERSON
IRVIN S. LOWNES Jr.
THOMAS L. RICHARDSON
BY Synnestvedt & Lechner
ATTORNEYS INVENTORS
FRANK H. Mc PHERSON
IRVIN S. LOWNES Jr.
THOMAS L. RICHARDSON
BY Synnestvedt & Lechner
ATTORNEYS INVENTORS
FRANK H. Mc PHERSON
IRVIN S. LOWNES Jr.
THOMAS L. RICHARDSON
BY Synnestvedt & Lechner
ATTORNEYS INVENTORS
FRANK H. Mc PHERSON
IRVIN S. LOWNES Jr.
THOMAS L. RICHARDSON
BY Synnestvedt & Lechner
ATTORNEYS INVENTORS
FRANK H. Mc PHERSON
IRVIN S. LOWNES Jr.
THOMAS L. RICHARDSON
BY Synnestvedt & Lechner
ATTORNEYS INVENTORS
FRANK H. Mc PHERSON
IRVIN S. LOWNES Jr.
THOMAS L. RICHARDSON
BY Synnestvedt & Lechner
ATTORNEYS INVENTORS
FRANK H. Mc PHERSON
IRVIN S. LOWNES Jr.
THOMAS L. RICHARDSON
BY Synnestvedt & Lechner
ATTORNEYS INVENTORS
FRANK H. Mc PHERSON
IRVIN S. LOWNES Jr.
THOMAS L. RICHARDSON
BY Synnestvedt & Lechner
ATTORNEYS INVENTORS
FRANK H. McPHERSON
IRVIN S. LOWNES Jr.
THOMAS L. RICHARDSON
BY Synnestvedt & Lechner
ATTORNEYS

INTERPRETIVE DATA RECORDER WITH SORT CAPABILITY

This application is a continuation-in-part of our copending Application Ser. No. 81,250, now U.S. Pat. No. 3,706,074, filed Oct. 16, 1790.

BACKGROUND OF THE INVENTION

Punch cards have numerous advantages which recommend their use as an input-output medium to a data processing apparatus. Unlike certain other mediums, the punch card constitutes a permanent, readable unit record which, unlike magnetic disc or drum-type devices, exists in readable form after the information has been inputted into the data processing system. In addition, the punch card is available to be used over and over for inputting information into a computer or into tabulating equipment. A single card frequently can store all of the information required about a particular event and, as such, constitutes a unit record. The use of punch cards further enables the information to be conveniently grouped.

One of the disadvantages attendant to the use of punch cards as an input-output medium for data processing operations concerns the necessity up until now to have available anywhere from three to five different machines for performing the five distinct card operations necessary for processing a transaction file and master file for conventional file updating and maintenance in data processing applications. These operations include:

1. card creation
2. card verification
3. card sorting
4. card merging and interfiling
5. processing detail cards and master cards for file updating and maintenance Accordingly, it is a principal object of the present invention to provide a free standing punch card machine capable on its own of performing all of the required data preparation, auxiliary, and peripheral input-output operations necessary for processing a transaction file and master file for conventional file updating and maintenance in data processing applications.

SUMMARY OF THE INVENTION

The updating and maintenance operations referred to above are best explained in terms of examples and for this purpose a more detailed description of a master file update routine is set out below; however, it may be well to review briefly the nature of the five distinct punch card processing operations.

Taken in the order of their presentation above, the card-creation operation involves the steps of entering information into a punch card from a source document. In the preferred embodiment of the present invention the card-creation operation is performed in a data recorder such as is described in the aforementioned copending patent application bearing Ser. No. 81,250.

The card-verification step is an operation normally performed in conjunction with the card preparation operation. In this operation the operator, working with the source document used to create a card, reenters the informational content of the source document into the memory of the data recorder for comparison with the informational content of the previously created card. If upon comparison the data recorder registers a disparity between the informational content of the card originally prepared and the verification information, an error is registered and another new card must then be prepared with a corrected version of the input information. The details of implementation of the verify operation are likewise developed in the aforementioned copending patent application bearing Ser. No. 81,250 now U.S. Pat. No. 3,706,074.

The card-sorting operation proceeds in any one of four modes: numeric, numeric edit, alphanumeric or zone. When the data recorder is operative in the sort mode the normal data recording controls of the unit are disabled as is the keyboard proper. Sorting occurs on a column-by-column basis with three passes per column, two of which are required to distinguish digital information while the last pass or zone pass is used to distinguish numeric from alphanumeric information.

Card merging and interfiling involves the capability of merging the cards from two different stacks into a single stack on the basis of the informational content thereof or alternatively interfiling blank cards behind each of the cards comprising a master file.

Th file updating and maintenance operations include card file feeding, reading, punching and stacking of both detail cards and master cards. Included in the file maintenance and updating operations are the reproduce and interpret functions. In the reproduce mode of operation new cards are prepared using the informational content of a previously prepared card deck; while in the interpret mode cards that were created on a nonprinting data recorder may have all or selective portions of the informational content thereof printed on the card.

Various combinations of the aforementiond card preparation and processing operations may be involved in any one job; however, it shoud be made clear that the operating capabilities of the subject invention are such as to enable the apparatus to perform all of the peripheral operations necssary for complete transaction and master file processing as may be required of a punch card data processing system.

Accordingly, it is a more specific object of the preset invention to embody in a single data recorder the operating capability of performing the five distinct card operations characteristic of a punch card data processing system.

Other features of the present invention which facilitate the operation of the subject data recorder will be apparent from the description and explanation of the operation of the subject system which follows.

IN THE DRAWINGS

Figure 1:
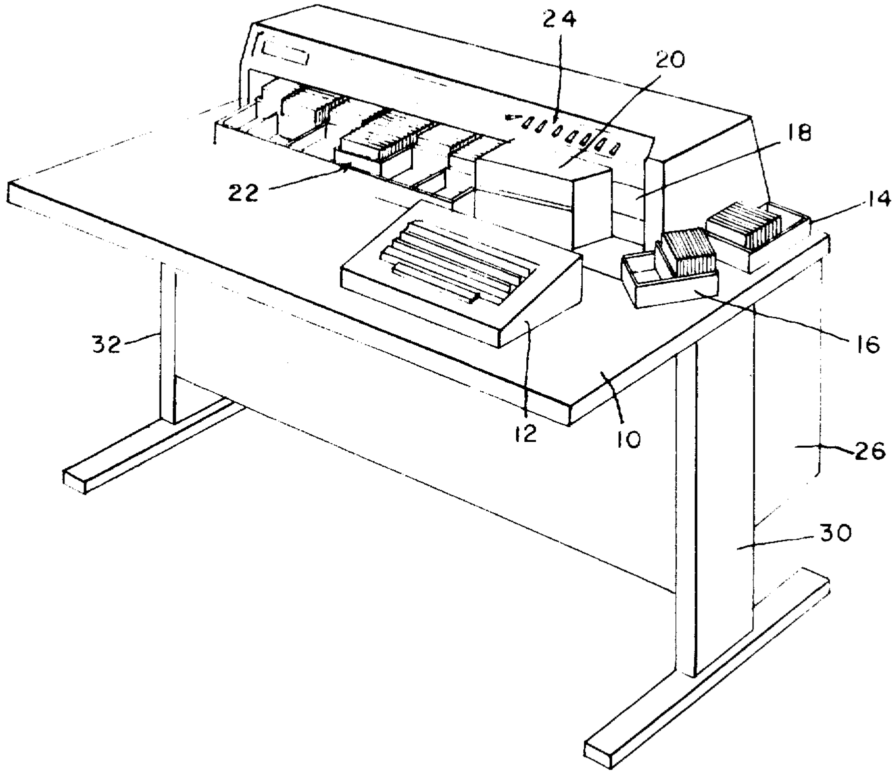
FIG. 1 represents a perspective view of a data recorder constructed in accordance with the principles of the present invention.
Figure 2:
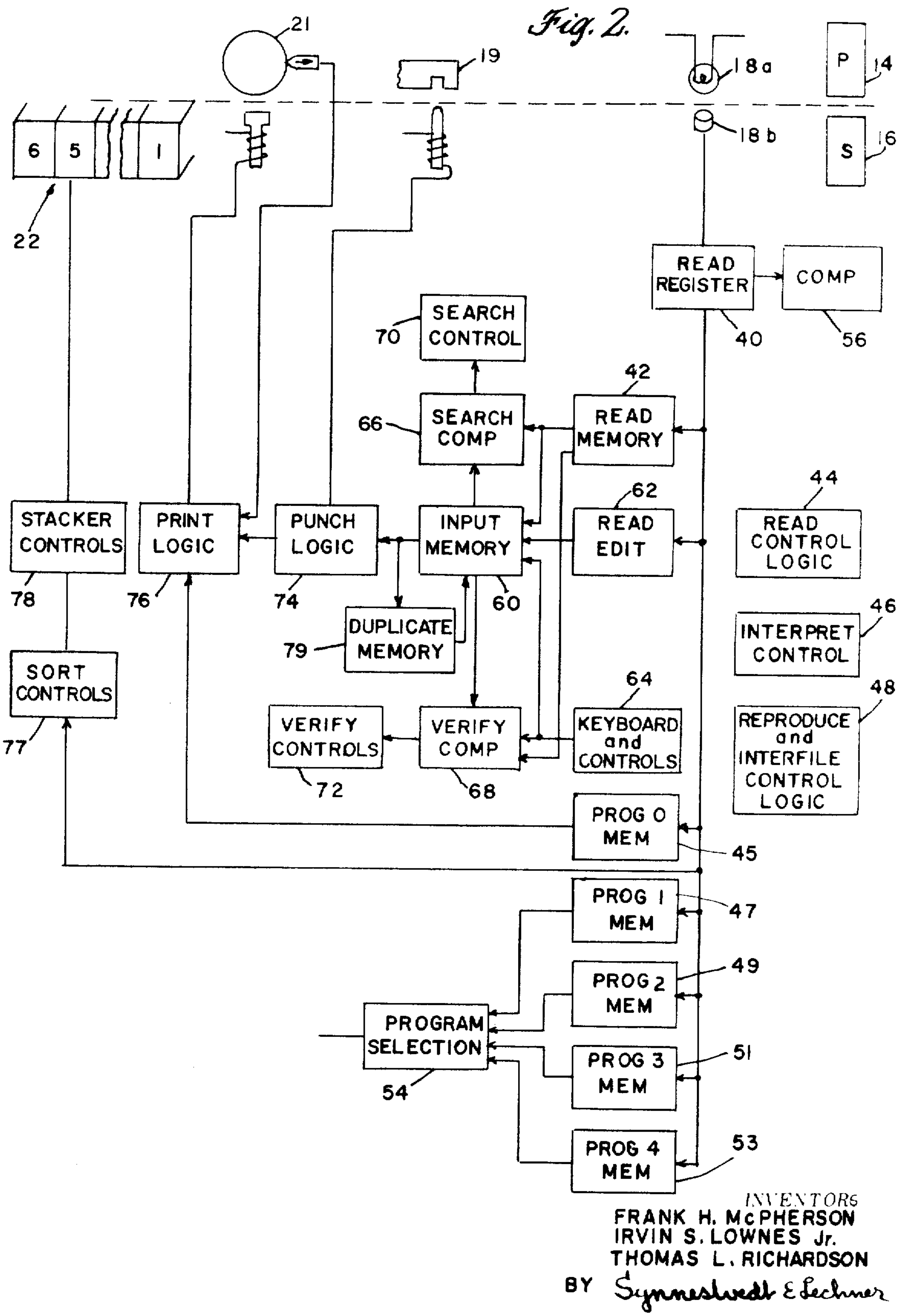
FIG. 2 is a diagrammatical representation of the data recorder of FIG. 1.
Figure 3:
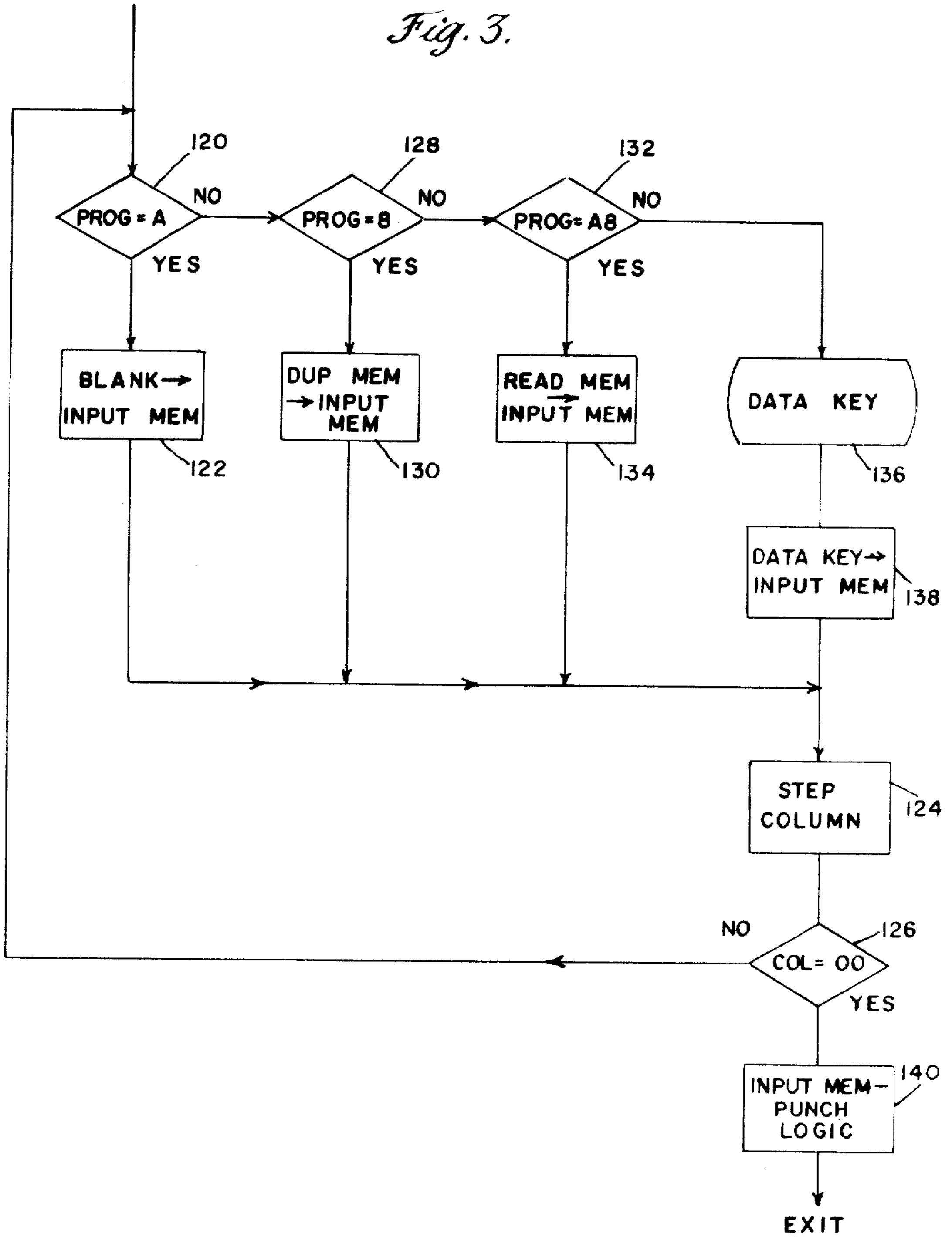
Figure 4:
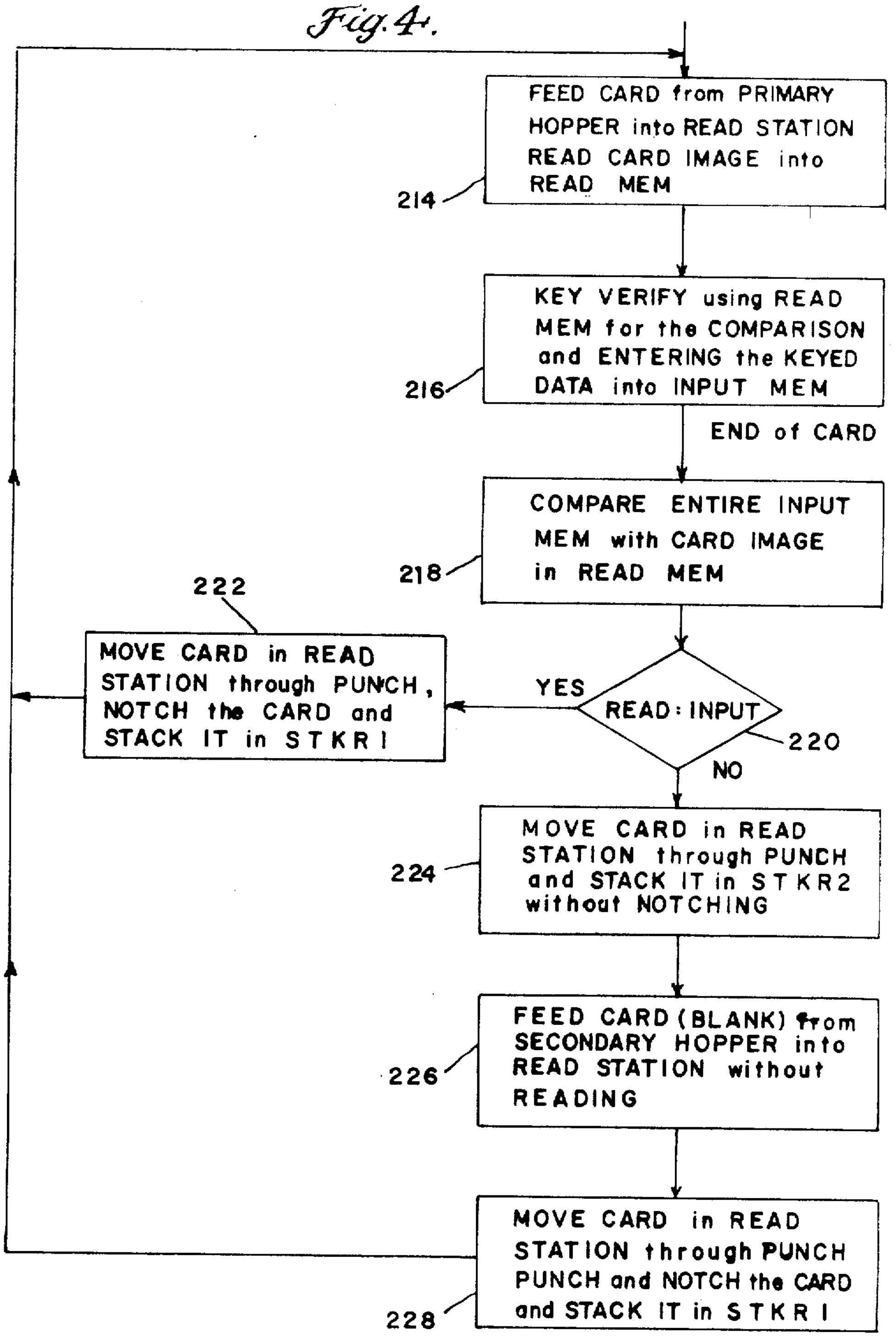
Figure 5A:
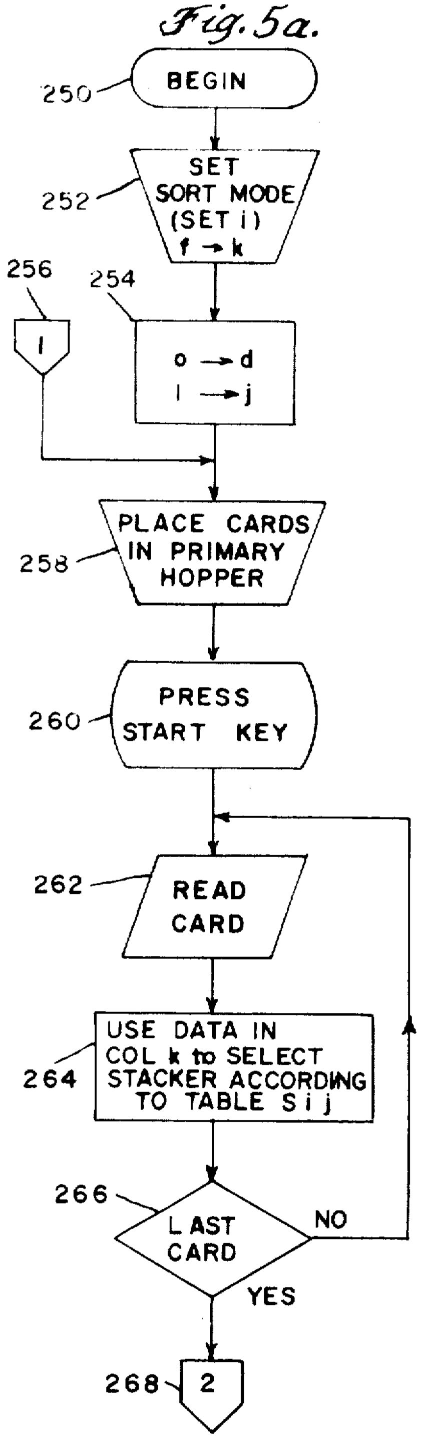
Figure 5B:
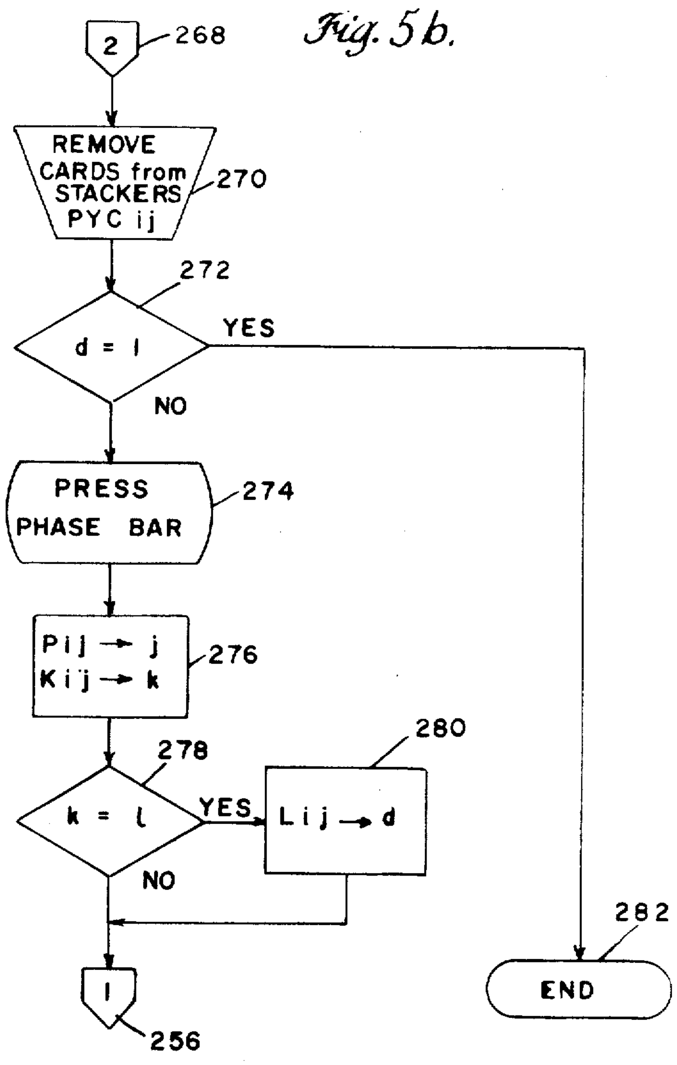
Figures 6A, 6B:
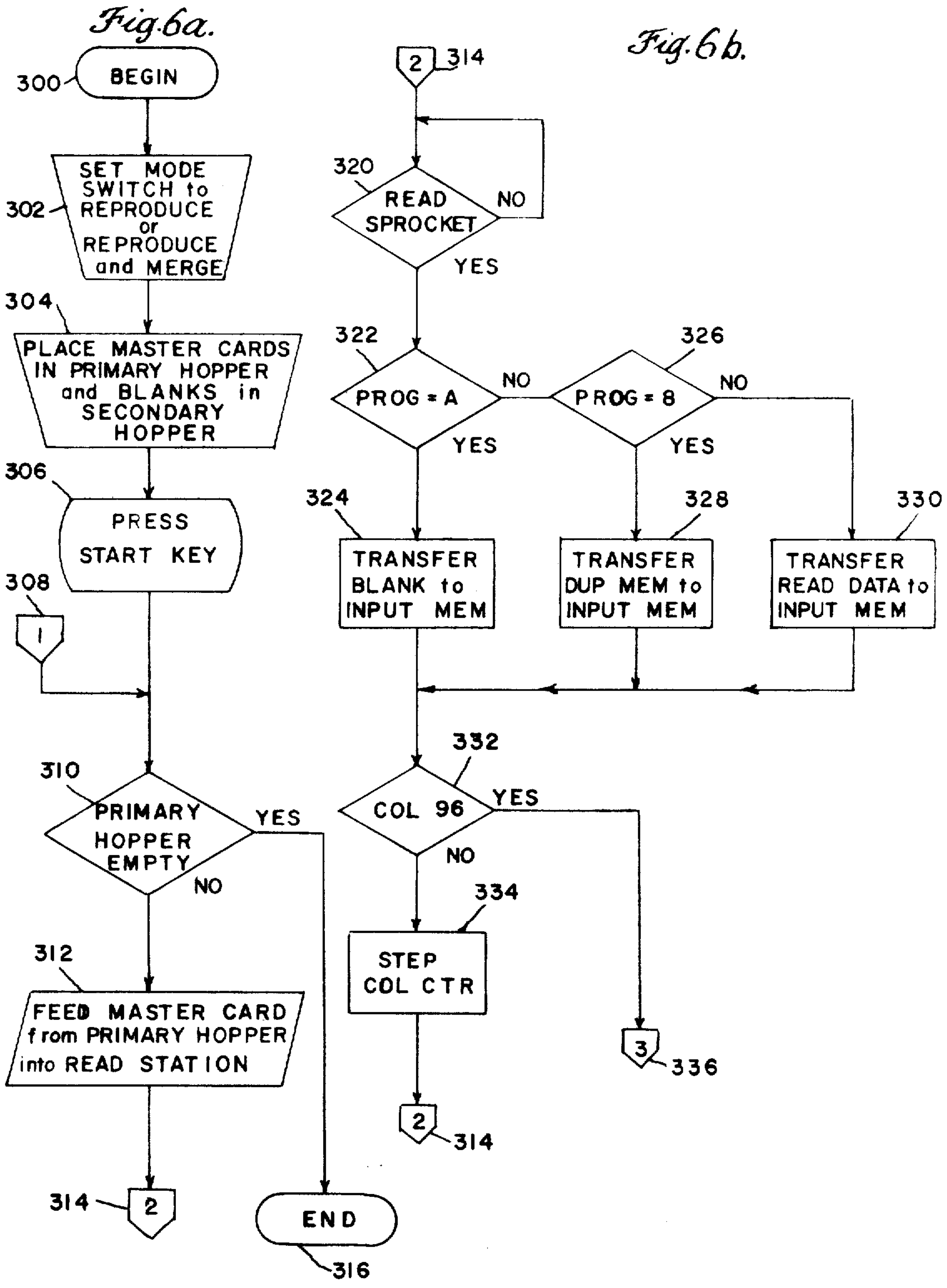
Figures 6C, 6D:
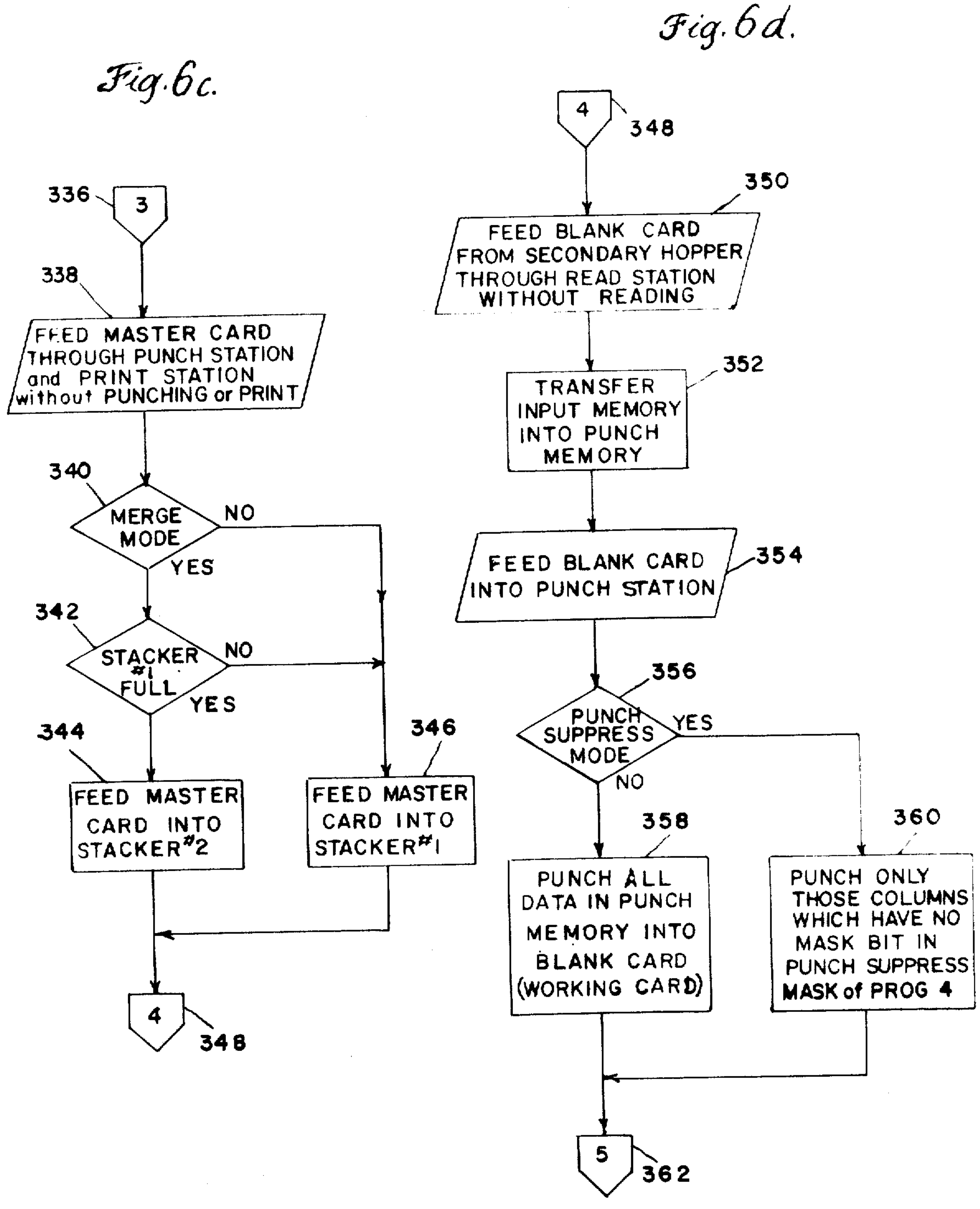
Figure 6E:
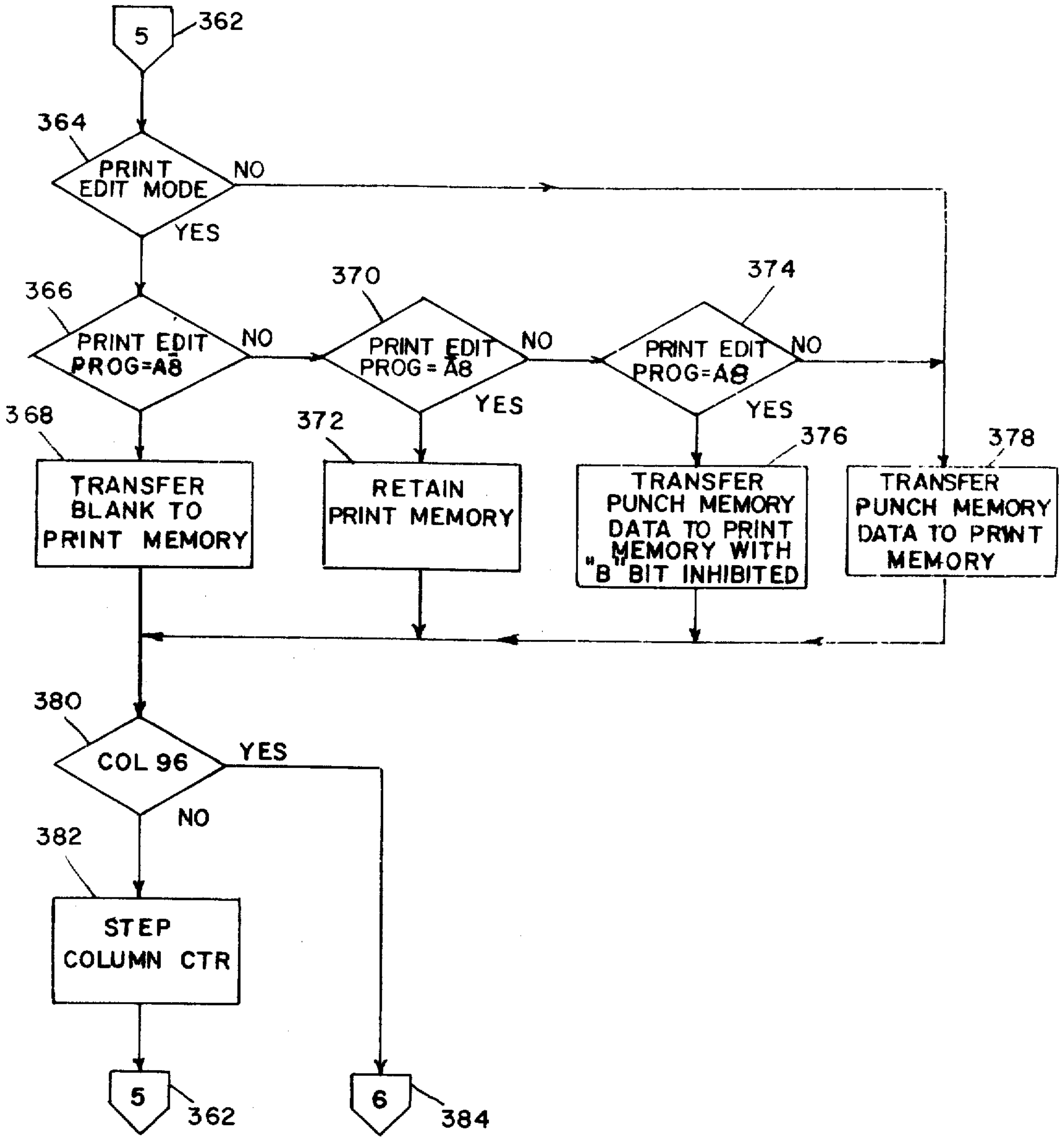
Figures 6F, 6G:
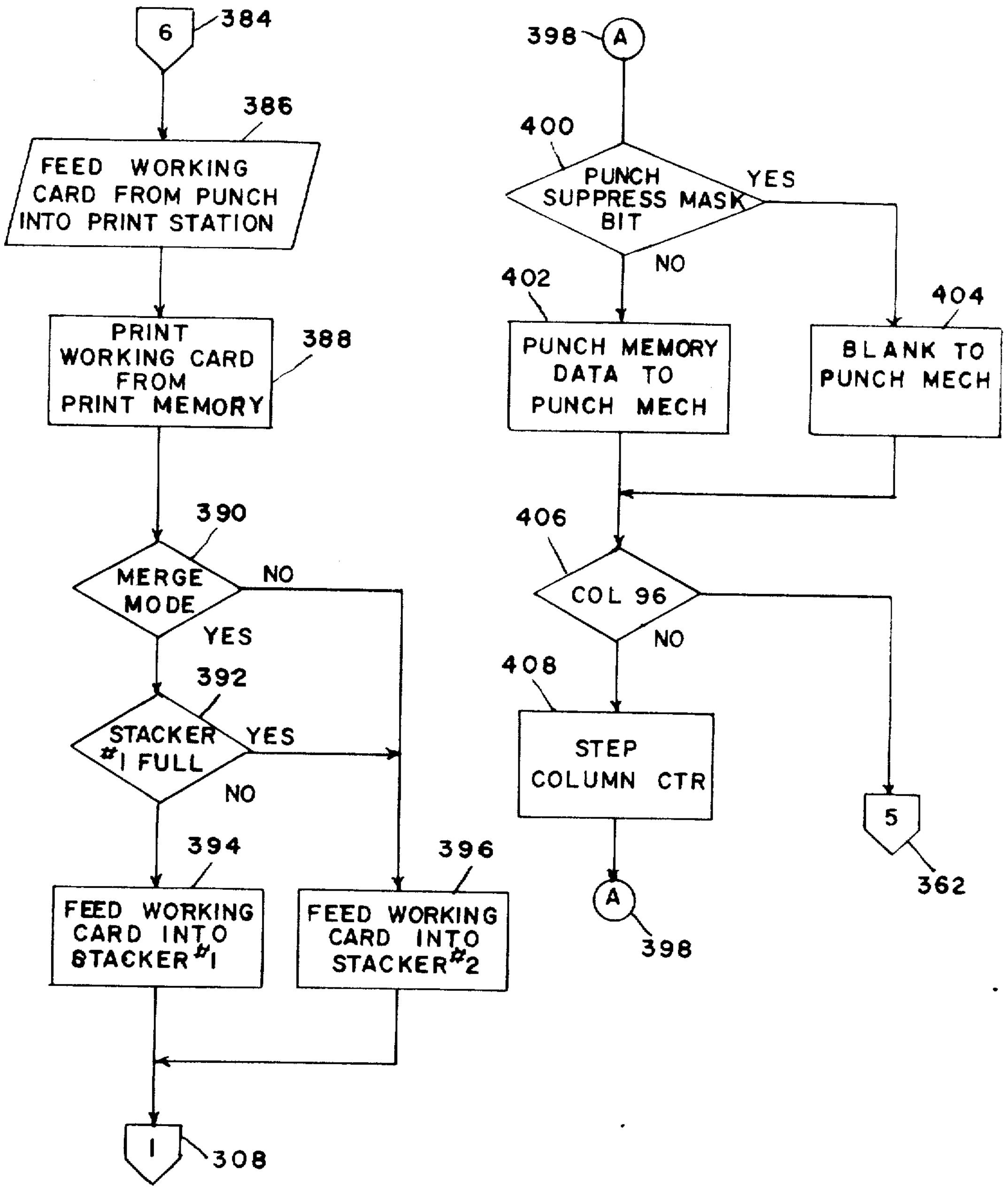
Figure 7:
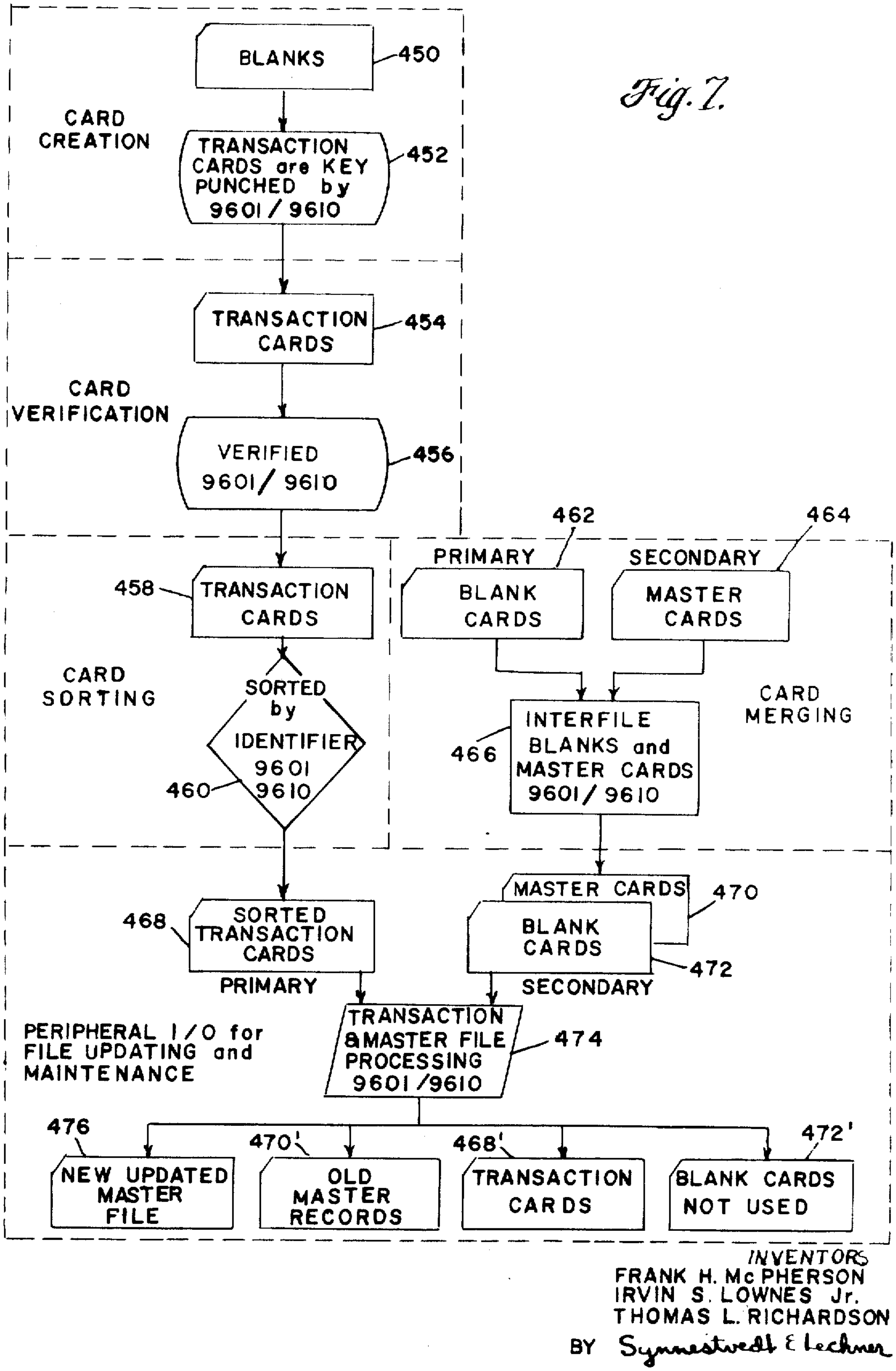

FIG. 3 constitutes a flow chart depicting the operations involved in the creation of a new card as performed in the apparatus depicted in FIGS. 1 and 2;

FIG. 4 constitutes a flow chart depicting the operations involved in the execution of the autoverify operation in the apparatus of FIGS. 1 and 2;

FIGS. 5A and 5B constitute flow charts depicting the operations involved in the execution of the card-sort operation in the apparatus of FIGS. 1 and 2;

FIGS. 6A through 6G constitute flow charts depicting the operations involved in the execution of the reproduce or reproduce and interfile mode of operation in the apparatus depicted in FIGS. 1 and 2; and FIG. 7 constitutes a detailed representation of the forms and operating steps involved in the execution of a master file update routine in accordance with the apparatus and operations outlined in FIGS. 1 through 6.

DESCRIPTION OF THE INVENTION

Referring now to the drawings for a more detailed description of the invention, FIG. 1 represents in perspective view the embodiment of a data recorder constructed in accordance with this invention. This data recorder consists of a desktop 10 upon which is mounted a keyboard 12, the latter being of conventional design and preferably implemented with electronic encoding means. Also mounted on the desktop to the rear of the keyboard is the card-processing portion of the data recorder.

Included in the card-processing portion of the data recorder are primary and secondary card input hoppers 14 and 16, respectively.

As will become apparent from a further explanation of the data recorder, the primary and secondary card input hoppers are loaded with blank cards or previously punched cards to be used in any one of the preparation and processing operations performed by the data recorder. The cards from the primary and secondary card input hoppers 14 and 16 are fed by transport means within the housing of the data recorder, to a card read station shown generally as member 18 and from thence to a punch-print area 20 also located within the housing. After having been punched and/or printed the cards emerge from the punch-print area of the data recorder and are selectively deposited in any one of a plurality of multi-card output stackers 22. A plurality of selectively settable switches 24 are provided to control the various operations of the data recorder and as such are positioned convenient to the operator. The control functions of the switches 24 are supplemented by special keys on the keyboard 12.

The desktop 10 rests on a lower structure comprising a housing 26 having a pair of legs 30 and 32. Within the housing 26 are located the electronics and power supplies necessary to support the operation of the data recorder.

For a better appreciation of the system organization giving rise to the multiple operating capabilities of the subject data recorder, reference is made to FIG. 2 which discloses in diagrammatic fashion the major components of the data recorder of FIG. 1.

In the upper portion of the drawing of FIG. 2 is depicted a broken line representation of the flow path of punch cards as they travel from right to left through the system. In the upper right-hand corner are diagrammatically depicted the primary and secondary card input hoppers 14 and 16, respectively. As explained above, punch cards from the primary (or secondary) card input hopper are fed to a read station depicted diagrammatically as comprising a light source 18*a* and a photoelectric detector 18b.

From the card read station 18 the punch cards are transferred to a punch station depicted in FIG. 2 as member 19. From the punch station the cards are transferred to a print station 21 where the indicia entered at the punch station 19 may be visually recorded on the face of the card. From the print station 21 the cards proceed to the plural output stackers 22 where they are sorted on the basis of information contained therein in response to signals generated in the data recorder.

Although the various operating stations depicted diagrammatically at the top of FIG. 2 may be considered old when construed independently, and accordingly may be implemented with conventional means, their system organization represents a unique combination which in turn gives rise to the unique operating capabilities of the present system. For further insight into the details of implementation of the components comprising the flow path of the punch card as depicted by members 14 through 22, reference is made to the copending Canadian application of Rober J. Miller and Walter Dorfman entitled "Data Processing Equipment", filed 7/9/71, bearing Ser. No. 117,811.

Continuing now with the explanation of the system organization of FIG. 2, the lower portion thereof diagrammatically depicts the major logic components of the data recorder including the data path traversed by the information being processed. The data paths have been shown without the interconnecting control circuitry in order to avoid confusion; however, it should be understood that interconnecting circuitry is provided for selectively distibuting control signals to gating means associated with each of the components to thereby control the transfer of cards and data within the system.

The punch cards used in association with the preferred embodiment of the present invention has 96 card columns divided into three tiers of 32 character columns each. Each character column may be punched to represent one alphanumeric character, this representation being effected by a conventional six bit binary code. In the preferred embodiment of the present invention, means are provided to simultaneously scan the 18 bits of information comprising a card column. Once scanned, the 18 bits may be independently interpreted as three characters of information.

From the conventional potoelectric card scanning means 18 an electrical signal representation of the information comprising one column of the punch card is transferred to a read register 40. The read register 40 serves as a temporary store for the information being scanned, and as such serves as an intermediary buffer for information being transferred into a read memory 42. Read memory 42 is capable of storing a binary coded representation corresponding to 96 alphanumeric characters of information, that is, the total contents of a single punch card. The read memory 42 and the read register 40 may both be implemented by conventional storage devices such as magnetic cores or electronic flip1flops. In such implementation, conventional set, reset and sensin circuitry are provided to control and interpret the informational contents of the storage devices.

Information is transferred from the read register 40 to the read memory 42 under control of signals generated in the read control logic 44. The read control logic 44 may be of the type disclosed in U. S. Pat. No. 3,670,144 which is incorporated herein by reference. The read control logic 44 in turn operates under the control of signals generated in one of a plurality of stored programs. As represented in FIG. 2, there are five programs in the preferred embodiment of the present invention; these being further stored within memories 45 through 53. Selection of program 1 through 5 is effected by program storage selection means 54 which alternatively may comprise one or more of the selectively settable switches 24, or special keys of the keyboard 12.

Control signals generated in the read control logic 44 effect the transfer of information from read register 40 to the read memory 42. This transfer is also effectively under the control of signals generated in a comparator 56. The comparator 56 functions as a form of mod-2 check on the information being inputted to the read memory 42 from the read station 18 via the read register 40.

Read memory 42 photoelectric as a buffer for storing the contents of a punched card being scanned preliminary to the transfer of the informational contents thereof to the main operational memory of the system, the latter being identified in the drawing of FIG. 2 as member 60 flip-flops. sensing and referred to hereinafter as the input memory.

Other access paths are provided to the input memory 60 including a path through read-edit control circuitry, represented in FIG. 2 as member 62, and alteratively through the keyboard 12, represented in FIG. 2 as member 64. The read edit control circuitry 62 may be of the type disclosed in U. S. Pat. No. 3,360,781 which is incorporated herein by reference. The functions of the read-edit control circuitry and the keyboard control circuitry will become more readily apparent from an explanation of the operation of the subject system which follows.

In passing, it should be noted that the read-edit block receives information directly from the card reader via the read register 40. Information is also inputted into the program stores 45 through 53 via the card reader. The program stores contain relatively fixed information for organizing the sequence of operations used in performing the varied operations capable of execution in the subject data recorder. Thus, program No. 1 may be a typing program; program No. 2, a read master file program; program No. 3, the search portion of a key field search and update operation; and program No. 4, an autoverify operation.

Program selection via the program selection means 2 of FIG. 1 (and 54 of FIG. 2) will initiate the transfer of control signals to various ones of the components depicted in FIG. 2. The nature of this transfer and the mode of operation of the data recorder in the execution of various operations is depicted more fully in the explanation of the other drawings given below.

Information from the input memory 60 may be transferred to any one of three areas of the data recorder. Thus the information may be transferred to the punch-print area 20 of FIG. 1, or to a search comparator 66 for comparison with the data contents of a card in master file during a key search and update operation; alternatively, the contents of input memory 60 may be transferred to another comparator 68 for card verification purposes. Associated with the search comparator 66 and the verify comparator 68 are search and verify control means 70 and 72, respectively. The search comparator 66 and associated search control circuitry 70 may be of the type disclosed in U. S. Pat. No. 3,670,144 which is incorporated herein by reference. The verify comparator 68 and associated verify control means 72 may be of the type disclosed in U.S. Pat. No. 3,360,781 which is incorporated herein by reference.

The data path from memory 60 to the punch-print area 20 of FIG. 1 includes punch and print logi identified in the drawing of FIG. 2 as members 74 and 76, respectively. This portion of the data path includes editing circuitry which facilitates the reformating of the information in a manner suitable for interpretation by the punch and print control circuitry. In addition, this portion of the system facilitates revision to the content of the information being transferred from input memory 60 to the punch logic 74 and a simiar reformating capability for information being transferred to print logic 76. The punch logic 74 and print logic 76 may be of the type disclosed in U. S. Pat. No. 3,670,144 which is incorporated herein by reference.

The print-edit mode of operation proceeds under control of a program which in the preferred embodiment of the present invention is stored in the program zero memory of member 45 of FIG. 2. This program is separately actuated by the operator upon the setting of the program selection switch 24 to the print-edit mode of operation. The function performed by the program zero memory and the necessity of it being separately actuated will become readily apparent from the explanation of the print-edit mode of operation given in more detail below.

The print-control circuitry includes a print comparator and a print counter which are associated with a solenoid-actuated print hammer and a sensor for monitoring the relative position of a print roll. The components used in the operation of the punch-print logic may be of a conventional design but in any event are of the type disclosed in the aforementioned copending application bearing Ser. No. 81,250.

After passing through the print station, the cards are selectively deposited in one or another of the output stackers 22. Each of the stackers is capable of accommodating approximately 400 punch cards. Conventional solenoid-actuated control circuitry operating in response to signals generated in the stacker controls 78 functions to control the sorting of the cards arriving at the output stackers 22 from the print area 21. The distribution of cards in the respective output stackers 1 through 6 of member 22 is a direct result of signals generated in the stacker controls 78 which in turn is governed by sort controls 77, the latter directing the data recorder in the execution of sort routines and variations thereof. The stacker control 78 and associated sort control 77 may be of the type disclosed in U. S. Pat. No. 3,597,491 which is incopporated herein by reference.

Somewhat analogous to the role of the read control logic 44 and the sort controls 77 of FIG. 2 are the roles played by the interpret control 46 and the reproduce and interfile control logic 48 in the execution of the interpret and reproduce modes of operation of the subject system. The interpret control logic 46 may be of the type disclosed in U. S. Pat. No. 3,670,144 which is incorporated herein by reference; and the interfile control logic 48 may be of the type disclosed in U. S. Pat. No. 3,360,781 which is incorporated herein by reference. As indicated above, the steps depicting the execution of the reproduce mode of operation are set out in detailed fashion with repect to FIGS. 6A through 6G herebelow.

CARD-CREATION MODE OF OPERATION

An explanation of the card-creation mode of operation has been developed in the aforementioned patent application bearing Ser. No. 81,250, of which the present application is a continuation-in-part. In the aforementioned patent application particular attention was directed to the key field search and update operating capability which constitutes an important part of the operational capabilities of the subject data recorder; however, for our purposes only brief mention of this operating capability need be mentioned here. The present data recorder is implemented such that during the card preparation phase of operation it is possible to automatically locate a particular card in a master file by performing a search for a key entered into memory or from a specified number of cards read into the system. Cards comprising the master file to be searched are fed into the system from a first source. Once a card is found whose informational content matches that of the key entered into memory, the contents of that card are read into memory and selected portions thereof are transferred to a punch station for entry into a blank card. Additional information may be entered into memory via the keyboard to supplement that being transferred from the card located as a result of the key search. When the transcription process is complete for a card, a blank card is read from a second source and punched accordingly. The newly punched cards are accumulated in one of the plurality of output stackers while the master cards are collected in another one of the output stackers. For purposes of explanation it is sufficient to note that the key field search and update capability is available to expedite the card-preparation operation; however, it is necessary here to consider only the actual card preparation phase of that operation.

In this respect the card-preparation operation is initiated by the operator who sets the controls of the data recorder by way of an appropriate one of the switches 24 to effect the selection of a particular one of the programs in the program memories 1 through 4. In the preferred embodiment of the present invention the creation of a card proceeds under control of signals generated by program No. 1 as stored in member 47 of FIG. 2.

Reference is now made to FIG. 3 which depicts the operative steps involved in the preparation of a new card. However, before proceeding to an explanation of the steps involved in FIG. 3, it is first desirable to have an understanding of the manner in which information stored in the program No. 1 memory is effective in controlling the preparation of a new punch card. In this respect information may be entered in any one of the 96 columns of the punch card being created; however, information is generally entered in only selective fields of the punch card, each field being defined as a predetermined number of columns with the field being identified by the first and last column. To facilitate the entry of information into a specific field a program card, comprising a standard punch card and having selectively coded information therein establishing the field boundaries into which information is to be entered, is prepared by the operator prior to the initiation of the card-preparation operation.

The program card is read into program memory No. 1. as a preliminary step to the execution of the card-preparation operation. The program card is prepared by entering a predetermined code in those columns of the program card corresponding to the nature or source of information to be entered in the corresponding locations of the card being prepared. Thus, in the card preparation phase of the operation three such code configurations are embodied in the program card for program No. 1.

As indicated above, special code configurations are entered into the program card for each program to control the operation of the data recorder. The special code configurations are selected from among the various combinations of the two zone punches and the 4-digit punches available in the present six bit code. The zone punches are identified as Zone A and Zone B. The digit punches are assigned the values: 8, 4, 2 and 1. In an interpretative sense, the various combination of digit punches yields a binary recitation of a numeric value; while the combination of zone and digit punches provides alphabetic and special characters. Combinations of zone and digit punches are entered into the program card to direct the automatic operation of the data recorder. As indicated above, three such code configurations are embodied in the program card for program No. 1.

The first such code is a Zone A punch. As shown in FIG. 3, a determination is first made to ascertain whether the informational content corresponding to column 1 of the program card in program memory No. 1 contains a Zone A punch. If a Zone A punch is detected (120) a blank is entered into input memory in the corresponding column of the card being prepared (122). Thereafter the column addressing means is stepped (124) and, assuming a determination shows that the last column on the card has not been reached (126), the cycle is repeated.

If no Zone A punch is detected in the equivalent of the program card as stored in program memory No. 1, a test is made to ascertain whether a digital 8 punch exists in the same column of the program card (128). If a digital 8 punch is located in the program card, the information from the corresponding location of the previously processed card is entered into input memory at the corresponding locations (130).

It should be noted at this point that the information to be entered into a punch card is first generated and temporarily stored in the input memory 60, whereafter it is transferred to punch logic 74 where it is used in the punch operation. In conventional implementations, the information is readily available for recall to the input memory 60 from the memory portion of the punch logic 74. However, in the preferred embodiment of the present invention, the input memory 60 operates asynchronously with respect to the punch and print logic. This means that the input memory 60 may be out of step with the memory portion of the punch logic 74 and print logic 76 such that information can no longer conveniently be recalled to input memory. The asynchronous operation affords a faster processing speed; however, to enable information from previously prepared cards to be conveniently entered into cards currently being prepared, a duplicate memory 79 in FIG. 2 is operatively tied in with the input memory 60 such that the informational content of the previously processed card is stored therein and is thus readily available upon demand.

Returning now to the card-preparation operation depicted by the flow chart of FIG. 3, if no Zone A punch or no digital 8 punch is detected in the particular column of the program card, a test (132) is undertaken to ascertain whether the combination of an 8 and an A punch is present therein. If the combination of an 8 and an A punch occurs in the corresponding column of the program card, the informational content of the corresponding location of the master card being processed, as stored in the read memory 42, is transferred to the input memory 60 (134).

If, for the particular column of the program card, there is no code configuration detected, the data recorder stops, with the column into which information is to be keyed indicated. The data recorder is now ready to accept input information which, when entered (136), is transferred (138) to the input memory 60, whereafter the entire cycle of operation is repeated for the next column. Upon completion of the entry of information into the input memory the contents thereof are transferred (140) to the punch logic 74 for inputting into a punch card. After all columns of the card have been processed, and the information and input memory 60 transferred to the punch logic 74, the information is entered into the punch card at the punch station 19.

VERIFICATION OPERATION

Proceeding now to an explanation of the verification operation, an explanation thereof will be given in terms of the enhanced operating capability of the subject data recorder wherein the verification of previously prepared information proceeds in an automatic fashion so as to preclude the necessity of manual intervention by the keypunch operator as is normally required in conventional equipment upon the detection of an error and whereby a blank card must be manually substituted for the card found to be in error.

Verification is an operation conventionally performed in the preparation of punch cards. In the verify operation, the accuracy of the information recorded in previously prepared cards is checked. It is also conventional to implement data recorders such that only the information actually keyed into the card by the operator need be verified; means for automatically verifying information entered into the card automatically at the time the card is prepared, being known.

The advantage of the auto-verify function as performed in the subject data recorder concerns the capability of automatically performing the card handling functions therein. Thus, should an error be detected in the informational content of a card being verified, a blank card from the secondary hopper 16 will be automatically positioned at the punch station to receive a corrected version of the informational content of the card found to be in error. This operation will proceed without necessitating manual intervention on the part of the operator.

Reference is now made to FIG. 4, which depicts the operative steps of the apparatus of FIGS. 1 and 2 in executing the auto-verify operation. Before iniating the verify operation, the operator positions the previously prepared cards in the primary hopper 14. These cards are next transferred (214) by the transport mechanism of the data recorder to the read station 18, whereafter a card image thereof is registered in the read memory 40. Next (216) the operator keys information from the original source document into input memory 60 via the keyboard and controls 64. By means including the verify control 72, a comparison (218) of the entire content of the input memory 60 with the informational content of the read memory 42, is effected in the verify comparator 68. At this point, a decision (220) is made whether the contents of the auxiliary memory equals the contents of the input memory. If the answer is yes, the card presently at the read station is moved (222) to the punch area 19 where the card is notched before being transferred to the output stacker for stacking in output stacker No. 1.

If the results of the comparison (220) of the auxiliary memory and input memory is unfavorable, the card being verified is moved (224) through the punch area without notching and is stored in output stacker No. 2. In such cases, a blank card is fed (226) from the secondary hopper 16 and a corrected version of the information is automatically entered therein from memory, whereafter the card is notched (228) and stacked in output stacker No. 1. This completes the auto-verify operation for a particular card, the next step is to repeat the cycle for all remaining cards.

CARD SORTING

The execution of the sort routine in the subject data recorder is depicted diagrammatically in FIGS. 5*a*. and 5*b*.

The sort operation begins (250) with the operator establishing the nature of the sort operation to be performed (252). In this respect the sort may be numeric, numeric edit, alphanumeric or zone. The significance of the different types of sort operations concerns the number of interpretative cycles which must be conducted and the significance to be attached to the information sensed in each cycle. Thus, in a numeric sort only the numerically significant bits need be interpreted. Similarly, in a zone sort only the zone bits A and B have significance. Switch means are provided on the console of FIG. 1 to enable the operator to establish the nature of the sort. At the same time that the nature of the sort is being established, steps are taken by the operator to identify the first column to be sorted on. In this respect the sort may be selectively performed such that only certain columns are sorted on.

After the search mode and first column to be searched on have been established by the operator a logical zero condition is established (254) within the data recorder to indicate that a sort operation has been initiated. The logical zero condition will be replaced with a logical 1 at such time as the last column of the last card has been sorted on. After each cycle the data recorder automatically performs a check to ascertain whether the search has been completed and at such time a logical one is entered into the system to indicate the condition, which condition is displayed on the console by appropriate signal means.

Also at the time of initiating the sort routine a logical 1 is transferred into a binary display register to indicate that the search is in the first phase of operation for the particular column being scanned, there being at most three phases including a first, second and zone phase.

At this point in the sort routine the operator places the card deck to be sorted on in the primary hopper (258). Actual processing is initiated when the operator depresses the start key on the console (260). This in turn initiates the reading of a card (262), the informational content of which is transferred into a register for comparison with the information being sorted on.

Sort tables previously loaded into the machine are used to determine (264) the identity of the output stacker into which the sorted cards are stacked. After completing each pass the operator determines (266) whether the card just completed is the last card, i.e., by observing whether a logical 1 has been entered into the "*d*" register (254).

If the operator determines that the pass just completed is the last pass, the operator removes the cards from the stacker in accordance with a table for interpreting how the cards are to be removed from the stackers (270). If, upon completion of a pass, the operator determines that the pass just completed is not the last pass the phase bar is depressed (274) whereafter certain machine operations are automatically performed to update the register contents reflecting the progress of the sort. In this respect the phase register is updated (276) as is the column-indicating means. At such time as a determination is made that the column currently being sorted is the last column to be sorted (278) reference is made by the machine to the last pass table which in turn registers a done flag in the "*d*" register (280).

In this manner the system continues to recycle (256) until a logical 1 condition is detected in the "*d*" register (272) whereat the end of the sort routine is established (282).

To facilitate the interpretation of the sort flow chart of FIGS. 5*a*. and 5*b*., reference is made to the following table which identifies the various variables and tables referred to in the execution of the sort routine:

*i* — Type of Sort (numeric, numeric edit, alphanumeric, zone)
*j* — Phase (one, two, zone)
*k* — Column currently being "sorted"
*f* — First column to be sorted
*l* — Last column to be sorted
*d* — Done flag
*Cij* — Table to determine how to remove cards from stackers
*Sij* — Sort tables
*Pij* — Next phase table
*Kij* — Column step table
*Lij* — Last pass table

CARD REPRODUCTION AND INTERFILING

In the preferred embodiment of the present invention card merging and interfiling is implemented as a special case of card reproduction. Accordingly, reference is made to FIGS. 6*a*. through 6*g*. which represent the steps involved when the subject data recorder is operative in the reproduce mode.

The reproduce mode of operation is initiated (300) by the operator setting the mode switch on the console (302) to the reproduce or reproduce and merge positions, depending on the exact nature of the operation to be performed. At the same time the operator places the master deck of punched cards into the primary hopper of the data recorder (304) along with an appropriate number of blank cards into the secondary hopper. At this point the operator is ready to depress the start key (306) to initiate the operation of the data recorder in the reproduce mode. Once having accomplished the "set-up" operation for the reproduce mode, the machine functions to feed master cards from the primary hopper into the read station. This continues so long as a machine-made determination satisfies the consideration that the primary hopper is not empty (310). A signal indicating that the primary hopper is empty signals the operator that the reproduce mode of operation is complete (316).

Once a master card has been sent (312) to the read stations and its presence verified by the read sprocket mechanism (320) a scan is made of the analogous program card portion of the appropriate program 1 through 4 of FIG. 2 to determine whether the corresponding column of the program card has an A entered therein (322) in which event a blank is transferred (324) into input memory 60 for the corresponding columnar location in the card to be reproduced.

In the event no A appears in the program card for the column being scanned, a determination is made (326) to ascertain whether an 8 has been registered therein. If so, the contents of the duplicate memory 79 are transferred to the corresponding columnar location in the input memory 60.

Again, if no A and no 8 are registered in the program for the column being scanned, the information appearing in the corresponding column of the card being read (330) is transferred to input memory 60 for subsequent entry into the working card, i.e., the card being prepared.

This completes the scanning of a single column of the master card. This process is repeated for each of the 96 columns of the card under review; there being means (332) provided to determine when the 96th column has been scanned. So long as the latter condition has not been satisfied, the conclusion of each such determination is followed by the advancement of the column-indicating counter (334) whereafter the process is repeated.

When the last of the 96 columns of a particular master card has been scanned, the operation proceeds to the stack master card phase of operation (see FIG. 6*c*.).

In the stack master card phase of operation the master card is fed through the punch and print stations without punching or printing thereon (338). this is an obvious step taken to preserve the integrity of the information recorded on the master card. Depending on the mode of operation and the status of hopper No. 1 as determined by appropriate means (340 and 342) the master card, after having been read, will be transferred into stacker No. 1 (346) or stacker No. 2 (344). Under normal circumstances the master cards will be accumulated in stacker No. 1.

The next step in the operation is the feed and punch blank card step wherein a blank card is fed from the secondary hopper and transferred through the read station without reading (350). At essentially the same time the current contents of the input memory are transferred into punch memory (352) as the data recorder prepares to load the informational content of the preceding master card into the punch logic for entry into the blank card. To this end the blank card is positioned at the punch station (354).

At this point a determination is made (356) as to whether the data recorder is operating in the punch suppress mode. The punch suppress mode of operation enables information which would otherwise be punched into the card to be suppressed. It is the punch-suppress mode of operation which enables blank cards to be interfiled with the master card. In the punch-suppress mode of operation the information entered into input memory 60 from the master card is punched into corresponding locations of the blank card only for those columns which have no mask bit in the punch suppress mask stored in the form of an equivalent program card in program memory 4 (360). The details of the latter step are depicted generally in the box identified as 360 and are further elaborated upon in FIG. *6g*. In this respect, assume the system is operational in the punch-suppress mode; a determination is made whether a corresponding punch-suppress mask bit exists in program 4 for the columnar location being scanned (400). If the determination is affirmative a blank is directed to the punch mechanism for the corresponding columnar location of the working card (404); otherwise, the contents of punch memory are transferred to the punch mechanism (402). This process is repeated for each of the 96 columns of the punch cards (408).

The punch-suppress mode of operation may be selectively implemented such that data in a particular field only is suppressed. Alternatively, the operation may be made to apply to the entire contents of a card thus enabling the interfiling of blank cards as noted above.

The next phase of the reproduce operation is referred as the print-edit routine. This mode of operation permits selective editing of the information transferred from the master card to the punch station 19 and entered into the working card thereat. Just as the punch edit permits selective punching of information from the master card, the print edit permits the selective editing of the contents of the punched information, i.e., not all of the material punched need be entered onto the card at the print station. This could include otherwise privileged information. The print-edit routine also permits information to be entered into fields other than those being punched.

In the preferred embodiment of the present invention the execution of the print-edit routine is under the control of information stored in the zero program memory 45 of FIG. 2. Upon determination that the system is operative in the print-edit mode of operation (364) a further determination (366) is made to ascertain whether an A8 combination exists in the column of the program card of program zero corresponding to a columnar location in the working card. If the determination is affirmative, a blank is transferred (368) to print memory for entry into the corresponding location of the working card. If the combination of the $A\bar{8}$ is unsatisfied a determination is initiated (370) to ascertain whether an $\bar{A}8$ combination exists in which event a signal is generated to retain the contents of print memory (372) for entry into the corresponding location of the working card.

Again, if the A8 determination fails a similar determination is made as to whether an $\bar{A}8$ combination exists (374). In the event it does, a transfer of the contents of punch memory to print memory for entry into the corresponding location of the working card is made with the B bit inhibited (376).

The significance of the transfer of the contents of punch memory to print memory with the B bit inhibited (376) concerns the ability of the subject system to prevent confusion because of somewhat unorthodox use of character bits for sign designation purposes. More specifically, in the subject data recorder the sign of a numeric quantity when negative is indicated by using a zone B bit in combination with the highest order numeric digit of the negative number. In order to avoid a misinterpretation by the print logic which would otherwise recognize the combination of the B zone punch and the numeric designating bits as an alphanumeric character (which when printed as part of a numeric quantity would further confuse the user) the print-edit mode is used to correct the situation and at the same time avoid confusion by transferring only the numeric indicating bits to print memory.

Should all of the preceding tests fail or should the initial determination indicate the system is not operating in the print-edit mode, there follows directly from the punch-suppress mode of operation of FIG. *6d*. a transfer of the contents of punch memory data to print memory (378). This process is repeated for each of the 96 columns (380), means being provided to step the column counter after each such scanning operation (382).

The last phase of the reproduce mode concerns the disposition of the working card through the print stations and into the output stacker. This phase of operation is initiated with the card being transferred from the punch station into the print station (386); the contents of print memory being used to effect a print out on the card (388). Thereafter a determination is made (390) as to whether the cards are to be processed in the merge mode (390) whereby the cards are interfiled with master cards, or whether the cards are to be stacked separately from the cards constituting the master file. In the further event that the cards are being merged but that the output stacker No. 1 is full, (392) the cards are transferred to output stacker No. 2 (396). In either event the next step involves a repeat of the operating steps of FIGS. *6a*. through *6g*. on each of the cards of the master deck to be reproduced or interfiled with a blank card.

INTERPRET MODE OF OPERATION

A variation of the above-outlined reproduce or reproduce and interfile mode of operation is available in the preferred embodiment of the present invention and is hereinafter referred to as the interpret mode of operation. In this mode of operation cards which were created on a non-printing data recorder may have the information entered therein made visible by way of the print mechanism.

This mode of operation constitutes a variation of the reproduce operation outlined above and as such the flow chart for the interpret mode of operation need not be reproduced here. It is significant only to remember that in the interpret mode only one output card will result. Accordingly, the initial phase of the interpret mode involves the handling of cards similar to the manner in which the master cards were processed in the reproduce mode of operation. Thus, the information in the card or cards to be interpreted is first read into input memory 60. Since the interpret mode of operation by its definition is not meant to add new punched information to the card, the punch operation is bypassed by employing the punch suppress feature outlined above with respect to FIG. *6d*. In this way the information from input memory bypasses the punch mechanism and is transferred to the print memory for eventual entry onto the face of the card. The print-edit routine of FIG. *6e*. is available in the interpret mode thus enabling changes to be made in the informational content to be printed on the face of the card. This enables privileged information to be deleted while permitting additional pertinent information to be added in printed form only.

After each of the cards has been printed a determination is made as to whether Stacker No. 1 is full or not and if not the cards are accommodated in Stacker No. 1. If the latter becomes filled with cards the excess cards are transferred to Stacker No. 2.

TRANSACTION AND MASTER FILE PROCESSING OPERATIONS

The peripheral input-output operations necessary for updating and maintenance in a complete transaction master file processing system are perhaps best illustrated by way of an example involving these processing operations as well as the card creation, card verificaton, card sorting and card merging and interfiling operations outlined above. In this respect reference is made to FIG. 7 wherein are disclosed in diagrammatic fashion the steps involved in a master file updating routine involving each of the aforementioned operations. In the preparation of an updated master file, transaction cards are prepared from blank cards (450) by keypunching (452) information pertaining to current transactions into appropriate field locations of 96 column cards by a keypunch operator. This card creation phase of operation may employ the unique features of the aforementioned patent application bearing Ser. No. 81,250, including the key field search feature.

After the transaction cards (454) are punched they are verified (456) in accordance with the auto-verify operation otlined above. Once verified the transaction cards (458) are sorted by appropriate identifiers (460) in accordance with the sort routine outlined above. At this point the master cards (464) comprising the original file are interfiled (466) with blank cards (462) in the manner outlined in the explanation of the reproduction and interfiling mode of operation outlined above. At this point is in the updating of the master file we have the sorted transaction cards (486) plus the master cards (470) with interfiled blank cards (472). At this point the master cards are processed (474) against the transaction cards containing update information. This operation results in new master cards being prepared for those cards for which there is a corresponding transaction card. This phase of the operation involves the logical complexity of the central processing portion of a computer. In this respect the information on the old master cards are updated in light of the information contained in the transaction cards and the updated information es entered into the blank card interfiled with each master card. The blank card with the newly entered information now becomes the new master card. The old master cards (470') for which there is no corresponding transaction card remains part of the master file and as such are directed to a first hopper along with all of the cards comprising the newly updated master file (476). The old master cards (470') for which a corresponding transaction card was available are directed to a second output stacker; the transaction cards (468') are directed to a third output stacker; and, the unused blank cards (472') are directed to a fourth output stacker.

The above-outlined operating capabilities which enable all of the file maintenance and updating operation necessary to support a punch card data processing system and which makes the operating capabilities available in a single processing unit comprises a unique feature of the suject system not heretofore available.

From the above it can be appreciated that the various operations involved in the preparation of a punch card are conveniently facilitated by the design features and operational capabilities of the subject data recorder. It should be further appreciated that whereas the preferred embodiment of the present invention has been described in terms of a number of examples of these novel features and operating capabilities, these same design features and operation capabilities may have independent significance. Accordingly, it should be understood that the invention is not limited to the specific combination of design features and operating capabilities shown, but that the features can be rearranged without departing from the spirit and scope of the invention.

What is claimed is:

1. An interpretive data recorder for performing the peripheral input-output operations necessary for processing a transaction file and master file and conventional file updating and maintenance operations, including card creating, card verifying, card sorting, card reproduction, card merging, card printing, and interfiling of blank cards, and combinations and variations of these, comprising plural input hoppers for holding punch cards including both prepunched and blank cards, a card read station operatively connected to said plural input hoppers, punch card transfer means operative to selectively transfer one of said pre-punched cards to said card read station; an information store operatively connected to said card read station further comprising means to scan the contents of one of said pre-punched cards and to transfer the informational content thereof to said information store, a keyboard operatively connected to input information into said information store, comparison means for comparing corresponding portions of information inputed into said data recorder via said keyboard with that transferred to said information store from said read station, a print station, a punch station, means for transferring a blank card from one of said plural input hoppers to said print or punch stations, means for operatively connecting both said print station and said punch station to said keyboard and to said information store whereby information inputed into said data recorder from said pre-punched card and from said keyboard may be selectively printed and/or punched into said blank card, multiple card output stackers operatively connected to said card read, card punch and card print stations for selectively stacking pre-punched and/or blank cards processed through said interpretive data recorder, and control means comprising interpretive logic for controlling said data recorder in the performance of its various modes of operation, said control means further comprising a plurality of stored programs each of which is operative in combination with other signal generating means to step the interpretive data recorder through a particular phase of operation, and means for selectively activating a particular one of said programs.

2. An interpretive data recorder for performing the peripheral input-output operations necessary for processing a transaction file and master file for conventional file updating and maintenance operations in data processing applications, comprising means for creating a punch card inputting through a keyboard the information to be entered into said punch card by conventional punch and print mechanisms, verify means for verifying the informational content of a previously created card including means to compare the informational contents thereof with the information from the source document from whence the previously created card was prepared, card-sorting means for sorting punch cards on the basis of the informational content thereof, reproduce means for reproducing in whole or in part the contents of a previously created card including means comprising the card-punch means utilized in said card-creation phase of operation, and common interpretive logic for controlling the interpretive data recorder in the execution of the aforementioned modes of operation.

3. An apparatus according to claim 2 in which said means for creating a punch-card further comprises conventional card punch and print mechanisms, a card read station, plural punch card input hoppers for storing blank and pre-punched cards, punch card transfer means interconnecting said plural punch card input hoppers said card read station and said conventional punch and print mechanisms, a keyboard, means connecting said keyboard to said card punch and print mechanisms, said common interpretive logic further comprising means for generating control signals for alternatively inputting through said keyboard or through said card read station the information to be entered into said punch card by said conventional punch and print mechanisms.

4. A device for reproducing in whole or in part the informational content of a previously punched card in a blank card; said device comprising a punch card preparation device, said latter device further comprising plural input hoppers for storing respectively said previously punched cards and said blank cards, a read station, means for selectively transferring a previously punched card to said read station and for sensing the informational content therein, memory storage means operatively connected to said read station for storing the informational content of said previously punched card, card printing and punching means connected to the output of said memory store whereby information read from said previously punched card and stored in said memory store may be selectively transferred to said card printing and punching means for entry into a blank card, plural card stackers for selectively storing the cards being processed in said punch-card preparation device, and control means for effecting the processing of said cards in said punch-card preparation device, said last-named means including switching means to enable said device to selectively or totally reproduce the contents of a previously punched card into a blank card or alternatively to interfile said blank cards with said pre-punched cards.

5. The punch-card preparation device of claim 4 wherein said control means includes switching means selectively settable to enable the data preparation device to operate in either the reproduce or interfile mode and to selectively print information on said punch cards in either mode of operation.

6. The punch-card preparation device of claim 4 wherein said control means further includes storage means for storing information defining those columns of a blank card into which the information is to be punched from corresponding locations of a previously created card.

7. A punch-card apparatus operative to produce any of the plural modes of operation necessary to effect the normal updating and maintenance operations encountered in data processing operations, including the reproduction of previously punched cards and alternatively the interfiling of blank cards with previously punched cards, the method comprising the steps of (a) feeding a pre-punched card from one of a plurality of input hoppers to a read station; (b) scanning said pre-punched card and storing the contents thereof in storage means; (c) feeding a blank card from another one of said plural input hoppers to card printing and punching means; (d) transferring the informational content of said previously punched card to said card printing and/or punching means for entry into said blank card; and (e) transferring the pre-punched cards and the originally blank card to plural output stackers for selective stacking therein.

8. The method of preparing punch cards as outlined in claim 7 wherein as a preliminary operation switching means are selectively set to enable said apparatus to separately or totally reproduce and/or print the contents of a previously punched card into a blank card, or alternatively to interfile said blank cards with said pre-punched cards.

* * * * *

UNITED STATES PATENT OFFICE

CERTIFICATE OF CORRECTION

PATENT NO. : 3,774,155

DATED : November 20, 1973

INVENTOR(S) : Frank H. McPherson, Irvin S. Lownes, Jr., Thomas L. Richardson

It is certified that error appears in the above-identified patent and that said Letters Patent are hereby corrected as shown below:

Col. 2, line 22, "Th" should read -- The --;

Col. 2, line 35, "shoud" should read -- should --;

Col. 2, Line 41, "preset" should read -- present --;

Col. 4, Line 16, "117,811" should read -- 117,881 --;

Col. 4, Line 53, "fliplflops" should read -- flip-flops --;

Col. 4, Line 54, "sensin" should read -- sensing --;

Col. 5, Line 13, "photoelectric" should read -- serves --;

Col. 5, Line 18, after "member 60" omit --flip-flops. sensing--;

Col. 5, Line 22, "alteratively" should read -- alternatively --;

Col. 5, Line 43, "means 2" should read -- means 24 --;

Col. 6, Line 2, "logi" should read -- logic --;

Col. 6, Line 10, "simiar" should read -- similar --;

Col. 6, Line 49, "incopporated" should read -- incorporated --;

Col. 9, Line 56, "iniating" should read -- initiating --;

Col.12, Line 38, "this" should read -- This --;

Col.13, Line 40, "A8" should read -- $A\bar{8}$ --;

Col.13, Line 51, "A8" should read -- $\bar{A}8$ --;

UNITED STATES PATENT OFFICE

CERTIFICATE OF CORRECTION

PATENT NO. : 3,774,155

DATED : November 20, 1973

INVENTOR(S) : Frank H. McPherson, Irvin S. Lownes, Jr., Thomas L. Richardson

It is certified that error appears in the above-identified patent and that said Letters Patent are hereby corrected as shown below:

Col.13, Line 52, "$\bar{A}8$" should read -- A8 --;

Col.14, Line 64, "card" should read -- cards --;

Col.15, Line 48, "es" should read -- is --;

Col.15, Line 66, "suject" should read -- subject --;

Col.16, Line 64, after "card" insert -- by --(before inputting).

Signed and sealed this 15th day of July 1975.

(SEAL)
Attest:

RUTH C. MASON
Attesting Officer

C. MARSHALL DANN
Commissioner of Patents
and Trademarks